United States Patent
Mason

(10) Patent No.: US 6,368,112 B1
(45) Date of Patent: Apr. 9, 2002

(54) SKY DIVING TRAINING DEVICE

(76) Inventor: Jeffrey S. Mason, 13083 Hencher Rd., DeSoto, MO (US) 63020

( * ) Notice: Subject to any disclaimer, the term of this patent is extended or adjusted under 35 U.S.C. 154(b) by 0 days.

(21) Appl. No.: 09/606,233

(22) Filed: Jun. 28, 2000

(51) Int. Cl.[7] .............................................. A63B 69/18
(52) U.S. Cl. ...................... 434/253; 434/247; 434/258; 472/59; 482/51; 482/147
(58) Field of Search .................. 434/247, 258, 434/380, 392, 433, 253, 254; 472/59, 135; 463/36; 273/440, 454; 482/146, 147, 51

(56) References Cited

U.S. PATENT DOCUMENTS

| | | | |
|---|---|---|---|
| 563,578 A | * | 7/1896 | Emerson |
| 1,176,365 A | * | 3/1916 | Hartnett |
| 1,329,660 A | * | 2/1920 | Kaye |
| 3,578,381 A | * | 5/1971 | Young |
| 4,290,601 A | | 9/1981 | Mittelstadt |
| 4,386,915 A | | 6/1983 | Gilliam |
| 4,505,477 A | | 3/1985 | Wilkinson |
| 4,749,180 A | * | 6/1988 | Boomer |
| 4,759,558 A | | 7/1988 | Woods |
| 4,787,630 A | | 11/1988 | Watson et al. |
| 4,875,672 A | * | 10/1989 | Armstrong |
| 4,953,853 A | | 9/1990 | Loane |
| 4,953,858 A | * | 9/1990 | Zelli |
| 4,966,364 A | * | 10/1990 | Eggenberger |
| 5,240,417 A | | 8/1993 | Smithson et al. |
| 5,242,356 A | * | 9/1993 | Grenfell |
| 5,328,427 A | | 7/1994 | Sleamaker |
| 5,545,115 A | | 8/1996 | Corcoran |
| 5,630,774 A | | 5/1997 | Geschwender |
| 5,795,277 A | | 8/1998 | Bruntmyer |
| 5,895,340 A | | 4/1999 | Keller |

* cited by examiner

Primary Examiner—Jacob K. Ackun, Jr.
Assistant Examiner—Bera B. Miller
(74) Attorney, Agent, or Firm—Polster, Lieder, Woodruff & Lucchesi

(57) ABSTRACT

A sky diving training device for training a student to assume the correct position for free fall. The device has a platform mounted on a swivel. The student lies face down on the platform with his shoulders on a steering bar. When the student diver allows one shoulder to drop, the device begins rotating in a predetermined direction. When the student corrects his shoulder position, the device stops rotating, however if the student over corrects the shoulders, the device begins rotating in the opposite direction. The rotation simulates what happens in a free fall if the diver allows one shoulder to drop even slightly.

9 Claims, 4 Drawing Sheets

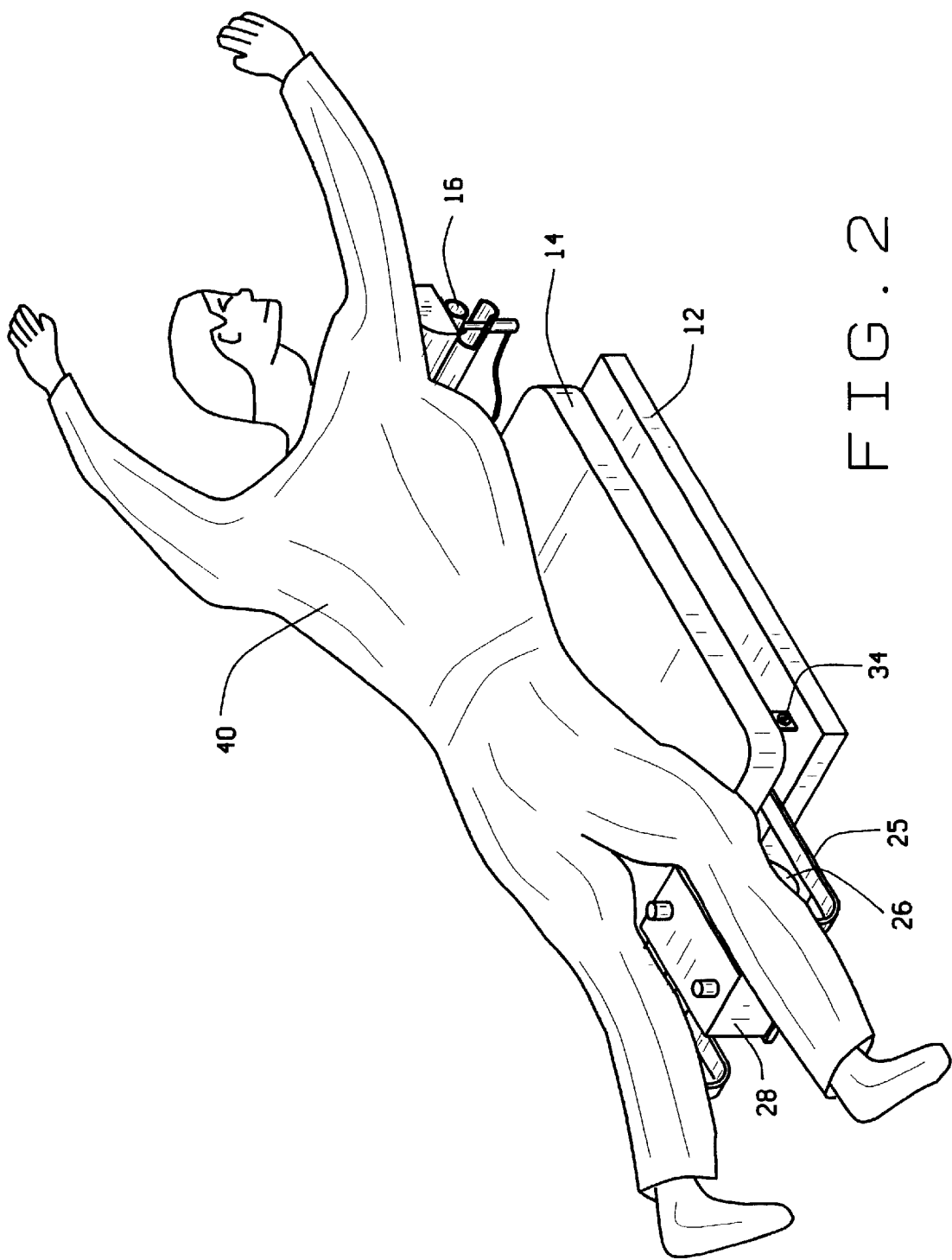

SKY DIVING TRAINING DEVICE

CROSS REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

The present invention relates to a sky diving training device which is used during the ground training of a new diver.

Sky diving is the term used for the sport of parachuting. The diver jumps from an airplane, experiences free fall for an approximate predetermined period of time and then opens his chute and somewhat slowly falls to the ground. When a potential diver is receiving his preliminary training on the ground before diving and between his first few dives, it is important that he be taught the correct body position to be maintained during the free fall part of the dive. This body position emulates lying on one's stomach with the arms extended overhead and the legs moderately spread apart.

During the free fall, the air velocity striking the free falling body, is approximately 130 miles per hour. If the diver allows one shoulder to drop below the level of the other shoulder, the air velocity causes the diver to rotate clockwise if the right shoulder drops or counterclockwise if the left shoulder drops. The rotation increases in speed without correction by the diver making it difficult to deploy the parachute. The device of the present invention teaches the diver to recognize the start of rotation of the body and how to instinctively correct it.

Devices to teach body response to external conditions have been developed. For example, U.S. Pat. No. 5,328,427 to R. Sleamaker provides a skating/skiing simulator with ergometric input-responsive resistance. U.S. Pat. No. 4,505,477 to J. Wilkinson provides a balancing board to teach the user to respond to changes of his footing while maintaining his balance. U.S. Pat. No. 5,545,115 to A. Corcoran provides a snowboard simulator apparatus to teach the skills required to snowboard. U.S. Pat. No. 5,895,340 to M. Keller provides a training device especially adapted for use in teaching techniques for snow boarding and skiing. None of these devices assists a sky diver in his endeavor to improve his skills for parachuting.

BRIEF SUMMARY OF THE INVENTION

The present invention provides a device suitable for teaching the skills required of a sky diver to prevent the diver from spinning uncontrollably during free fall. The sky diving training device is comprised of a base having a ring gear mounted thereon. A swivel is mounted to the ring gear, the axis of the swivel being directly above the axis of the ring gear. An elongated platform is mounted substantially centered on the swivel, the platform having attached thereto at one end a shoulder steering bar and at the opposite end of the platform an attached leg separation means. The shoulder steering bar pivots on a center allowing either end of the bar to be depressed downwardly so as to impact one of two switches placed under the ends of the steering bar. A dual polarity motor with a rotating gear is mounted on the underside of the platform. The motor and rotating gear are placed so as to engage the ring gear in a manner so as to result in rotation of the platform about the axis of the ring gear in a counterclockwise direction when the first switch is impacted or a clockwise direction when the second switch is impacted. A power source for running the motor is provided.

When using the training device, the user lies face down on the platform with the right shoulder on the end of the steering bar which impacts the second switch and the left shoulder on the end of the steering bar which impacts the first switch. The user's legs are separated by the separation means, which may be a battery, a box like structure, a pillow or the like.

When falling in a free fall, the diver needs to have the legs separated to allow maximum air flow without adversely changing the position of the diver's body. By using the device of the present invention, the student diver learns to assume the proper body position for the free fall phase of parachuting. The device requires maintaining the shoulders and torso in the necessary flat position for if a shoulder drops even slightly, the device immediately begins to spin the student simulating what happens during free fall if the proper body position is not maintained.

Leg rests may be added to the device by being fastened to the platform, one on each side of the leg separation means. The leg rests further enhance the proper position of the legs when practicing the free fall body position. As the student advances, the leg rests may be removed thus challenging the student to maintain proper position of the legs without the rests.

The dual polarity motor with the rotating gear allows relatively simple wiring to be used to have the gear change direction of rotation depending on which switch is activated. The switches preferably are four pole switches, again to allow simplicity when providing the circuitry of the device.

The power source for running the motor may simply be conventional electricity, a battery or other suitable power such as a generator or engine.

BRIEF DESCRIPTION OF THE SEVERAL VIEWS OF THE DRAWINGS

FIG. 2 is a perspective view of the device of the present invention illustrating the position of a student using the device;

Corresponding reference characters denote corresponding parts throughout the several views of the drawings.

DETAILED DESCRIPTION OF THE INVENTION

The following detailed description illustrates the invention by way of example and not by way of limitation. This description will clearly enable one skilled in the art to make and use the invention, and includes what presently is believed to be the best mode of carrying out the invention. Because changes can be made in the described device without departing from the spirit and scope of the invention, it is intended that all matter contained in this description or shown in the accompanying drawings shall be interpreted as illustrative and not as limiting.

Figure 1:
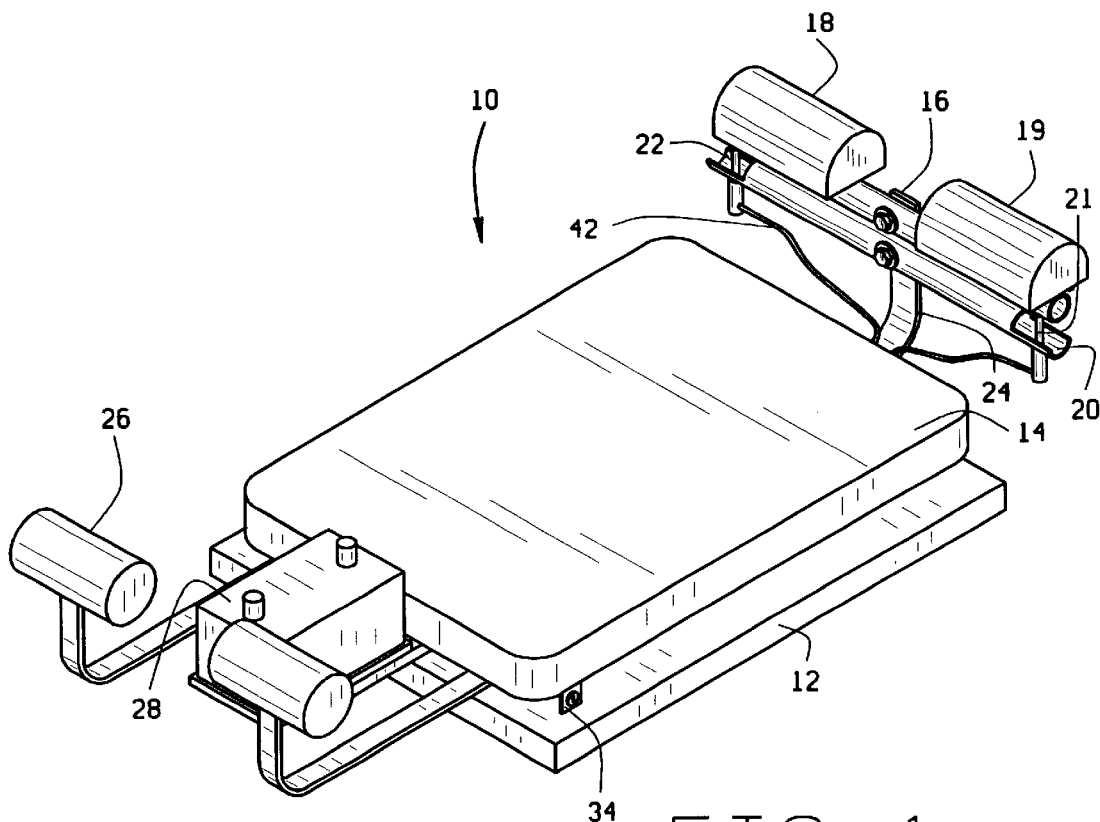
FIG. 1 is a perspective view of one embodiment of the present invention.
Figure 3:
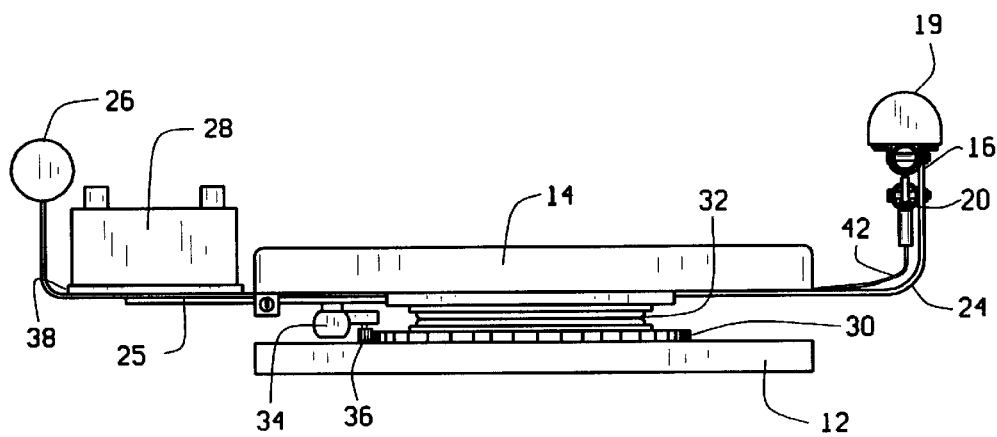
FIG. 3 is a side elevational view of one embodiment of the present invention.

FIGS. 1, 2 and 3 illustrate one embodiment of the sky diving training device 10. To a base 12 is attached a ring gear 30. A swivel 32 is affixed to the ring gear 30 with the axis of the swivel 32 being directly above the axis of the ring gear 30. An elongated platform 14 is mounted substantially centered on the swivel 32.

A dual polarity motor 34 is mounted on the underside of the platform 14. The motor 34 has a rotating gear 36 which engages the ring gear 30 to result in rotation of the platform 14 about the axis of the ring gear 30. At one end of the platform 14 is attached a shoulder steering bar 16. The bar 16 is attached to the platform 14 by means of a bracket 24. The shoulder steering bar 16 pivots from its center and has shoulder pads 18 and 19 so that if the left shoulder of the student 40 pushes downwardly on the shoulder pad 18, an impact switch 22 is activated and the platform 14 rotates in a counterclockwise direction. If the right shoulder of the student 40 pushes downwardly on the shoulder pad 19, an impact switch 21 is activated and the platform 14 rotates in a clockwise direction. The impact switches 21 and 22 are mounted on a stationary bar 20.

At the end of the platform 14 opposite the end where the steering bar 16 is mounted, there is a leg separating means 28 mounted on the platform 14. The leg separating means 28 may be a battery 28 resting on a small platform 38 or other separating means such as a pillow, a box, or other means effecting separation of the legs of the student 40. In a preferred embodiment, leg rests 26 are mounted onto the platform 14 by means of a bracket 25 on each side of the leg separating means 28. The leg rests 26 may be removable so as the student 40 progresses, the leg rests 26 are removed thereby requiring the student 40 to hold his legs in the proper position without the benefit of the leg rests 26.

Figure 4:
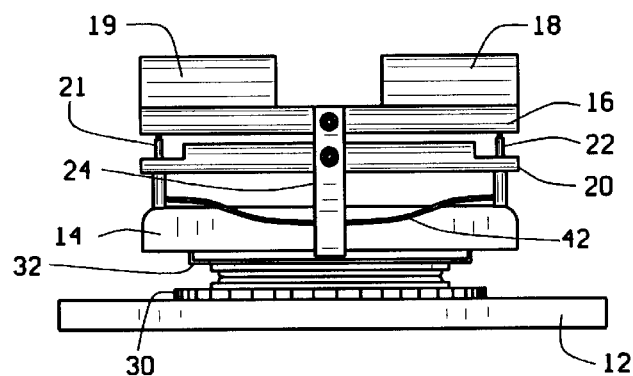
FIG. 4 is a front elevational view showing the steering bar in a neutral position.
Figure 5:
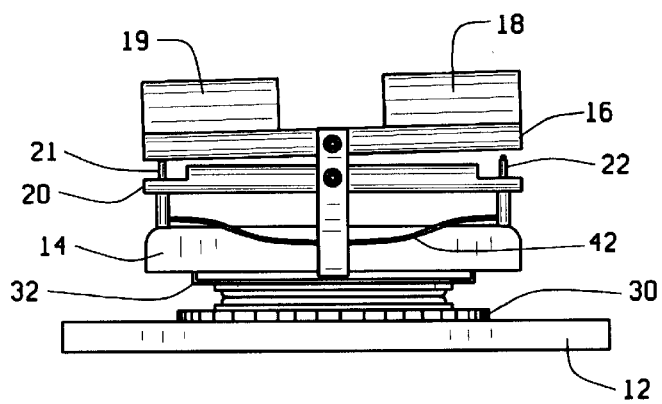
FIG. 5 is a front elevational view showing the steering bar with the right switch depressed.

FIGS. 4 and 5 are front elevational views which depict in FIG. 4 the shoulder steering bar 16 at rest with neither the switch 21 nor the switch 22 activated. In FIG. 5, the steering bar 16 has been pressed downward by the right shoulder and thus the switch 21 has been activated causing the platform 14 to rotate in a clockwise direction. When the student 40 realizes that the switch 21 has been activated thus commencing rotation of the platform 14, the student tends to correct his position by lowering the left shoulder thus activating the switch 22. When the switch 22 is activated, the platform 14 begins to rotate in a counterclockwise direction. Until the student 40 masters the correct position of the shoulders, the platform 14 will be rotating first in one direction and then in the other direction. The switching bar 20 containing the switches 21 and 22, can be placed closer to the shoulder steering bar 16 as the student advances to make the shoulder steering bar 16 more sensitive to depression of one of the switches 21 or 22 by one of the shoulder pads 18 or 19. In summary, the higher the switch bar 20 is moved toward the steering bar 16, the less depression required to activate one of the switches 21 and 22 thus training the student to become more exact in his body position required for a satisfactory free fall without rotation of the student's body.

Figure 6:
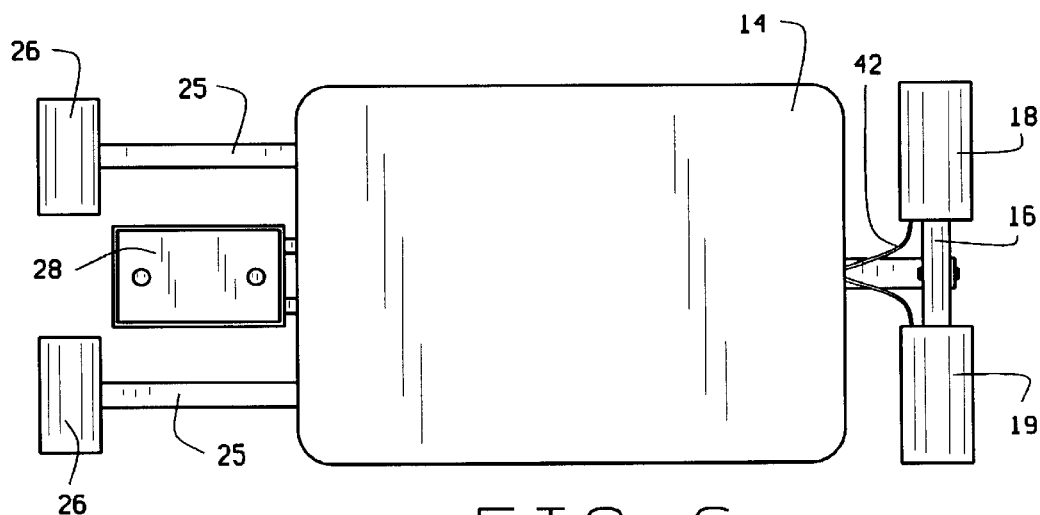
FIG. 6 is a top plan view of one embodiment of the present invention.

FIG. 6 is a top plan view of the device 10, depicting the platform 14 with the relative positions of the steering bar 16 with the left shoulder pad 18 and the right shoulder pad 19, and the leg rests 26 attached by the mounting brackets 25. A battery 28 is depicted mounted so as to be positioned between the legs of the student to remind the student that the legs should be apart to assume the proper free fall position. Other leg separation means can be used when the device is not powered by a battery. For instance, a small box, a pillow or other object can be used as an effective leg separation means. Wires 42 extend from the switching bar 20 under the platform 14 to the power source, in this case, the battery 28.

Figure 7:
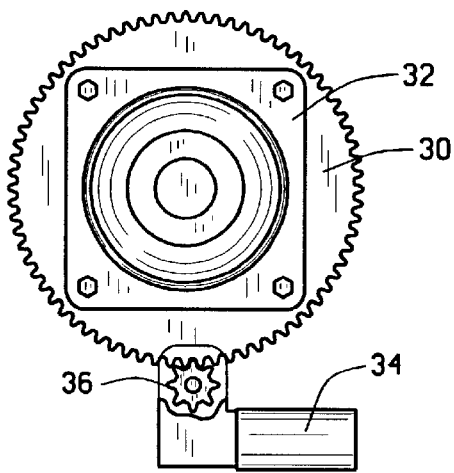
FIG. 7 is a top plan view of the ring gear, the swivel, the motor and the rotating gear.

FIG. 7 presents in detail the manner provided for the platform 14 rotation. A dual polarity motor 34 is activated by the switch bar 20 to rotate a rotating gear 36 either in a clockwise direction or a counterclockwise direction causing the motor 34 (which is attached to the platform 14) to rotate about the ring gear 30 resulting in rotation of the swivel 32 about its axis in turn resulting in rotation of the platform 14.

Figure 8:
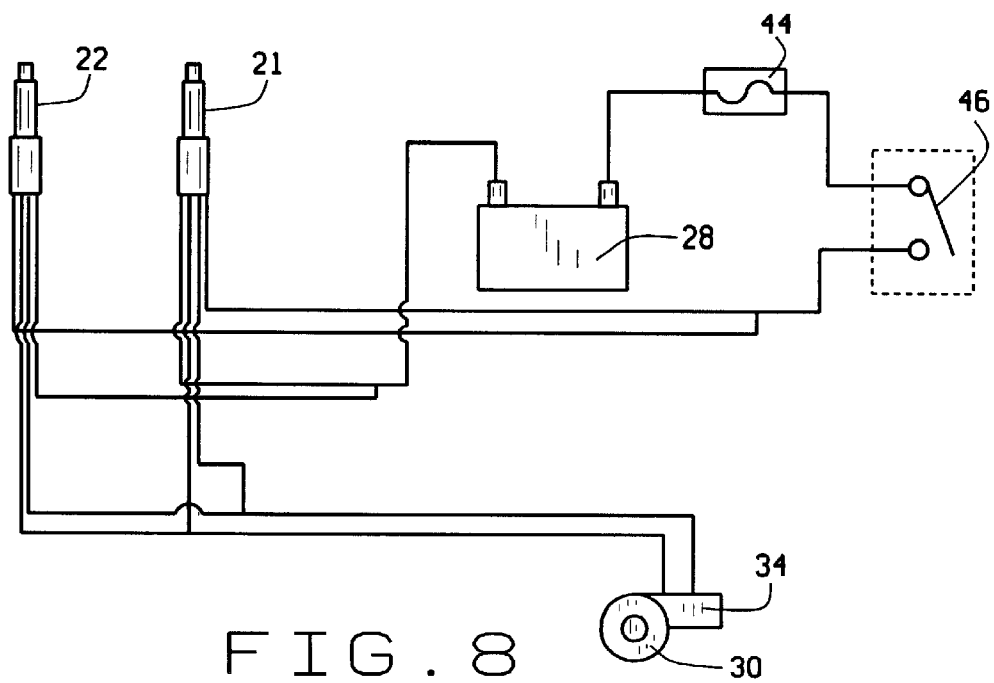
FIG. 8 illustrates the electrical circuitry for the device of the present invention.

FIG. 8 is a wiring diagram illustrating a power source 28 providing power through a fuse 44 to a switch 46. The switch 46 is an on-off switch to activate or deactivate the device 10. When the switch 46 is in the on position, power is provided to each of the switches 21 and 22. Each switch 21 or 22 is a 4-pole switch requiring depression to complete the circuit and send power to the motor 34. The motor 34 is a dual polarity motor so as to be responsive to the signal from either of switches 21 or 22. If the signal is generated by the switch 21 the signal directs the dual polarity motor 34 to rotate the gear 36 in a clockwise direction. If the signal is generated by the switch 22, the signal directs the dual polarity motor 34 to rotate the gear 36 in a counterclockwise direction. Although the illustration in FIG. 7 depicts a battery 28 as the power source, the power source may be a standard 110 volt AC line, a gasoline generator for generating electricity, a battery or other suitable source. Preferably the power source 28 provides electricity to power the dual polarity motor 34 which motor is sufficiently small to fit on the underside of the platform 14.

The base 12 is any convenient size and shape. For instance, the base 12 can be a platform which is rectangular, oval, elliptical, circular or other desired shape. The base 12 should be of sufficient size to accommodate the ring gear 30. As an alternative, the base 12 may be a pedestal or a pole so as to mount the device 10 at a desired height from the floor to enable an instructor to easily work with the student.

The elongated platform 14 is sufficiently long and wide to easily accommodate the torso of the average student. The leg rests 26 are attached to the platform 14 by use of a mounting bracket 25. The mounting bracket 25 may extend so as to adjust the distance from the edge of the platform 14 for the leg rests 26 for the comfort of the student. The leg rests 26 may be removed as the student advances thus requiring the student to maintain the proper position without assistance.

The leg separating means 28 is a battery, if it is desired that the power source be a battery, or the leg separating means 28 is an object placed so that the student's legs remain apart when the student is using the device 10. The object 28 is a battery, a pillow, a foam block, a box or other suitable leg separation means.

What is claimed is:

1. A sky diving training device comprising:
  (a) a base having a ring gear mounted thereon; the ring gear having an axis;
  (b) a swivel mounted to the ring gear; the axis of the swivel having an axis and the swivel being directly above the axis of the ring gear;
  (c) an elongated platform mounted on the swivel the platform having attached thereto at on e end a shoulder steering bar having a pivot which allows either end of the bar to be depressed downward impacting a left switch under the left end of the bar or a right switch under the right end of the bar and at the opposite end of the platform having attached a leg separation means;

(d) a dual polarity motor with a rotating gear mounted on the underside of the platform, the motor and rotating gear being placed so as to engage the ring gear resulting in rotation of the platform about the axis of the ring gear in a counter clockwise direction when the left switch is impacted or a clockwise direction when the right switch is impacted; and (e) a power source for running the motor.

2. The device of claim 1 wherein the base is selected from the group consisting of a platform, a pedestal, and a pole.

3. The device of claim 1 wherein the elongated platform is substantially rectangular in shape.

4. The device of claim 1 wherein the shoulder steering bar has a first shoulder pad and a second shoulder pad.

5. The device of claim 1 wherein the left and right switches are mounted on a switching bar.

6. The device of claim 1 wherein the leg separation means is affixed to the elongated platform and placed to effectively separate the legs of the user.

7. The device of claim 6 wherein the leg separation means is selected from the group consisting of a battery, a pillow, a box, a wood block and a foam block.

8. The device of claim 1 wherein leg rests are affixed to the elongated platform.

9. The device of claim 1 wherein the power source is selected from the group consisting of a battery, a 110 AC electric line and an electric generator.

* * * * *